United States Patent [19]

Kelly et al.

[11] Patent Number: 5,111,438
[45] Date of Patent: May 5, 1992

[54] METHOD OF ACOUSTIC PROCESSING FOR ACOUSTIC IMAGE CLASSIFICATION

[75] Inventors: James G. Kelly, Newport; Robert N. Carpenter, Portsmouth, both of R.I.

[73] Assignee: The United States of America as represented by the Secretary of the Navy, Washington, D.C.

[21] Appl. No.: 783,665

[22] Filed: Oct. 28, 1991

[51] Int. Cl.$^5$ .............................................. G01S 15/00
[52] U.S. Cl. ........................................ 367/87; 367/101
[58] Field of Search ................... 367/101, 87; 209/590

[56] References Cited

U.S. PATENT DOCUMENTS 4,939,698  7/1990  Murphree ........................... 367/101

OTHER PUBLICATIONS

Van Trees, H. L., "Detection, Estimation, and Modulation Theory", vol. 1, pp. 24-34, John Wiley and Sons, Inc., New York, N.Y. (1968).

Primary Examiner—Daniel T. Pihulic
Attorney, Agent, or Firm—Michael J. McGowan; Prithvi C. Lall; Michael F. Oglo

[57] ABSTRACT

A method of acoustic processing for acoustic image classification of an underwater target from a set of known target hypotheses is provided. An acoustic waveform is transmitted into a test volume of water containing the target to be classified. The test volume is divided into test cells such that each test cell contains a portion of the target or scatterer that will scatter the transmitted waveform. Scattering of the transmitted waveform at each test cell is described by a scattering coefficient that is unique for each of the targets in the set of known hypotheses. Accordingly, the scattering coefficient serves as an identifier of the target to be classified. The relationship of the set of scattering coefficients for each of the known target hypotheses is provided by a known covariance matrix. An acoustic receive array receives a portion of the scattered waveform from each of the test cells in the test volume. This received portion is a function of the scattering coefficients of the target to be classified and the transmitted waveform appropriately time delayed by the time between transmission and receipt. The scattering coefficients at each test cell are then estimated for each of the possible hypotheses. Estimation is based upon the known covariance matrices and the receive portion of the scattering. Then, an estimation is made of the received portion of the scattering for each of the possible hypotheses. Estimation of this receive portion is based upon the estimated scattering coefficients and the time-delayed, transmitted waveform. Finally, the estimated received portion of the scattering is correlated with the actual received portion of the scattering. A high correlation is indicative of the target to be classified.

5 Claims, 1 Drawing Sheet

METHOD OF ACOUSTIC PROCESSING FOR ACOUSTIC IMAGE CLASSIFICATION

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to acoustical processors and more particularly to a method of acoustic processing for acoustic image classification.

(2) Description of the Prior Art

Underwater systems capable of performing the function of target classification typically rely on acoustically derived measurements of the physical extent of the targets or false targets as part of the classification process. The measurements, gathered from spatially separated sensors generating split beams, are processed to form an acoustic image of the object in question. Characteristic parameters of the object (length, width, etc.) are then extracted from this acoustic image and used to determine the classification of the object.

Split beam processing is one conventional approach to the image formation process. Offset phase center beams (left/right, up/down) are used to generate angle estimates of threshold crossings produced from a sum beam output. The underlying assumption behind the split beam processor is that only one scatterer exists in each range bin of the acoustic image. Detecting the return from that scatter, the processor estimates the off-boresight angle to that scatterer. The estimated scatterer locations are then processed further to generate the image. The assumption of a single scatterer per range bin places a limitation on the usefulness of this approach. Many objects of interest in the classification problem can have significant cross range extent. The single scatterer model does not hold for these objects and the resulting image ma be difficult to classify.

SUMMARY OF THE INVENTION

Accordingly, an object of the present invention is to provide a method of acoustic processing for acoustic image classification of an underwater target.

Another object of the present invention is to provide a method of acoustic processing for acoustic image classification that processes the scatterer returns to achieve a cross-range that processes the scatterer returns to achieve a cross-range extent.

Other objects and advantages of the present invention will become more obvious hereinafter in the specification and drawing.

In accordance with the present invention, an acoustic waveform of known energy is transmitted into a test volume of water. The test volume of water is divided into a number of test cells. Each test cell contains one scatterer that reflects the transmitted waveform. A portion of each of the reflections is then received by an acoustic receive array. There exists a scattering coefficient for each test cell to describe the reflection in terms of the transmitted waveform A scattering coefficient for a particular test cell will vary depending on the type of target. The scattering coefficient is regarded as a (zero-mean and complex) random variable with a covariance matrix presumed known a priori. Accordingly, an estimate of the set of scattering coefficients may be used to classify a target. A database is provided with known covariance matrices relating the test cells for the volume of water for a number of known possible targets. Using the covariance matrices, the transmitted waveform, and the reflected waveform, estimates of the scattering coefficients are calculated for the possible targets. These estimated scattering coefficients for all the possible targets along with the transmitted waveform are then used to generate estimated reflections for all the possible targets. The estimated reflections are correlated with the actual reflected waveform at the acoustic receive array where a high correlation is indicative of the target to be classified.

BRIEF DESCRIPTION OF THE DRAWING

The FIGURE is a schematic representation of an acoustic system transmitting and receiving acoustic information with respect to a test volume of water used by the method of the present invention.

DESCRIPTION OF THE PREFERRED EMBODIMENT(s)

Figure 1:
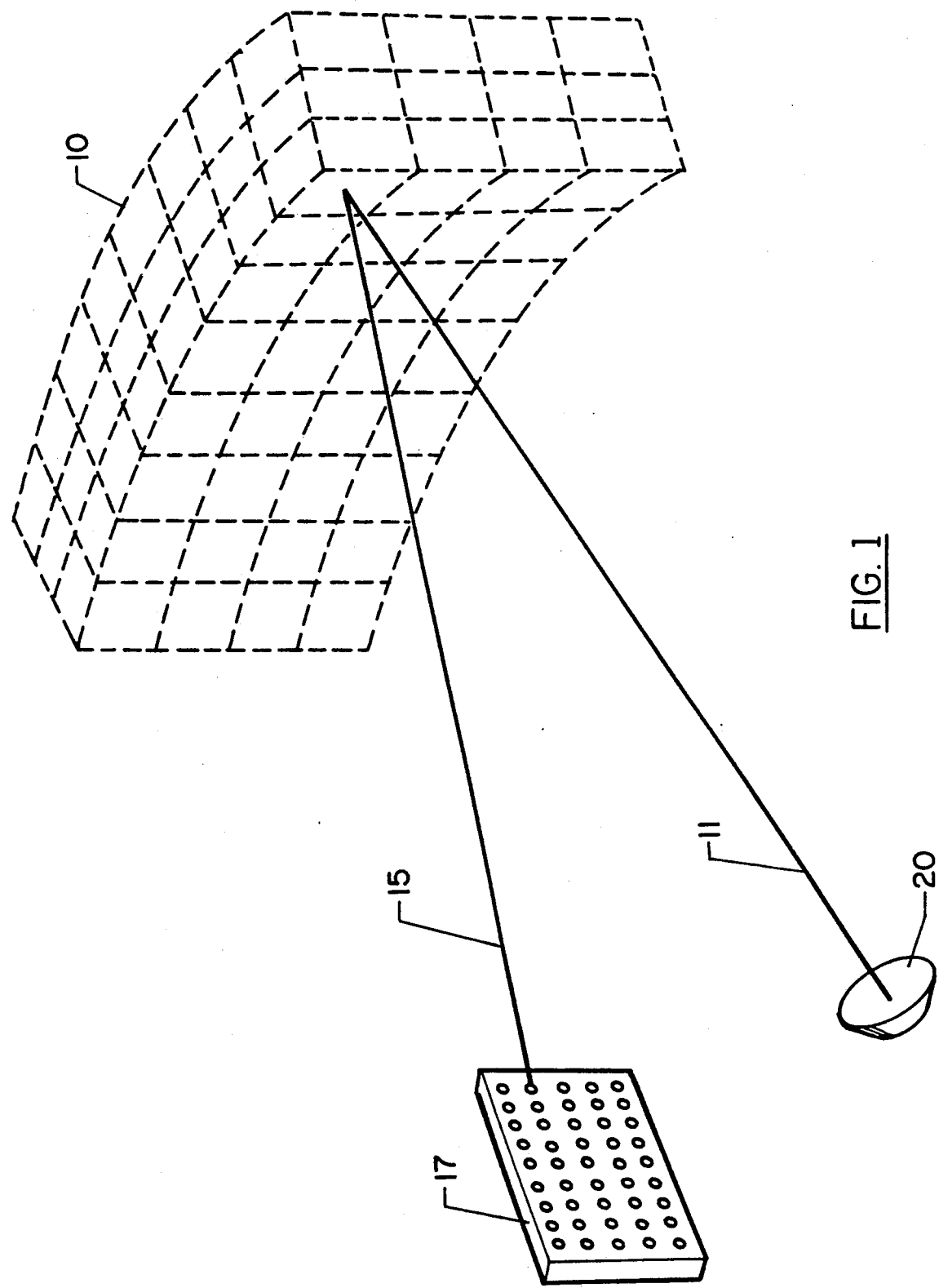

The active sonar detection problem is usually formulated as a binary statistical hypothesis test. Under the null hypothesis $H_o$, the sensors' outputs consist of noise alone, while alternative hypothesis $H_I$ consists of noise plus the sensors, response to the presence of a target. The active sonar classification problem can be similarly formulated, but as a multiple hypotheses test. There are at least two alternative hypotheses because, in addition to the signal produced by the target, another signal can appear in the sensor outputs. This other signal results from the sensors, response to the pressure field scattered from an object, distinct from the target assumed under $H_I$; however, it resembles in some significant way the signal produced by that of $H_I$. It may be a false target or the real target at some orientation other than that under $H_I$. In general, there may be several of these alternative "target-like" signals, each corresponding to a distinct class of scattering objects (either natural or manmade). Thus, the classification problem must be formulated as a multiple hypothesis test with a null hypothesis $H_o$ and alternative (exhaustive and mutually exclusive) hypotheses $H_i$, where $i = 1, 2, \ldots, I$ and $I > 1$. Mathematically, $H_o$ and $H_i$ can be expressed as follows:

$$H_o : x(t) = n(t); \tag{1a}$$

$$H_i : x(t) = s_i(t) + n(t), \tag{1b}$$

where t is the time interval of observation where $T_I$ and $T_2$ are the endpoints of the observation interval;

$x(t) = [x_1(t), x_2(t), \ldots, x_n(t)]^t$ is the $N \times 1$ complex vector of the N sensor outputs;

$s_i(t) = [s_{i1}(t), s_{i2}(t), \ldots, s_{iN}(t)]^t$ is the $N \times 1$ complex vector of the signal components for the N sensor outputs due to the presence of the $i^{th}$ object; and $n(t) = [n_1(t), k\, N_2(t), \ldots, n_N(t)]^t$ is the $N \times 1$ complex vector of the noise components of the N sensor outputs, and $[\ ]^t$ denotes the transpose of any vector.

Referring now to the drawing, a schematic representation is shown of an acoustic system for transmitting and receiving acoustic information with respect to a test volume of water 10 used to describe the method of the present invention. Test volume 10 is divided into M test cells where it is assumed that an i-th target from the set of I hypotheses resides The method of the present invention is a novel approach to classify the i-th target. For ease of description, only one test cell at a location m will be discussed. Hereinafter, this may also be referred to as the m-th test cell. However, the method of the present invention is applicable to all of the test cells in the test volume 10.

A transmitted acoustic waveform f(t) is transmitted from a sonar platform 20 beginning at t=0 for a duration of T. Transmitted waveform f(t) is designated by the lead line indicated by reference numeral 11. Transmitted waveform 11 strikes the m-th test cell and is scattered. A portion of this scattering designated by the lead line indicated by the reference numeral 15, is detected by an acoustic receive array 17 comprised of N sensors. For ease of description, only one sensor at a location n will be discussed. Hereinafter this may also be referred to as the n-th element. However, the method of the present invention is applicable to all of the sensors in I the receive array 17. Typically, each sensor in array 17 is an omni-directional acoustic sensor. The n-th element of receive array 17 receives a portion of the scattering from the m-th test cell which is observed beginning at a time $T_1$ where $T_1 > T$. Observation of the reception will last until time $T_2$. The time delay between transmission to the m-th element and reception the n-th element is defined as $\tau_{nm}$.

Each test cell also has a scattering coefficient $a_m$ associated therewith which is an indication of how the m-th test cell will scatter an impinging acoustic waveform. The value of the scattering coefficient $a_m$ is a function of the type of target residing within test volume 10. Accordingly, for every i-th target at an m-th test cell, there exists an individual $a_{im}$ which is true for one and only one of the I hypotheses. Since each test cell contains, at most, one scatterer, the set of scattering coefficient $a_{im}$, m=1 to M, is indicative of the target to be classified. The m-th test cell also has a velocity component, $v_{im}$, in a direction along the line designated by the lead line indicated by reference numeral 11. This velocity component is due to the assumed relative uniform velocity between the sonar platform 20 and the test volume for the i-th hypothesis. If no relative motion exists between the sonar platform 20 and the test volume for the i-th hypothesis, the velocity component $v_{im}$ is zero for all m=1, 2, ..., M.

For the i-th target to be classified, a signal received by the n-th element of receive array 17 during the time $T_1$ to $T_2$ from all of the M test cells is defined as $s_m(t)$. The signal received by receive array 17 is a function of the transmitted waveform II appropriately time-delayed, dilated (or contracted and weighted by the individual scattering coefficients $a_{im}$. The dilation or contraction is due to the relative motion between the sonar and the test volume, and may sometimes be referred to as relative motion temporal adjustment in this specification and appended claims.

The signal received by the n-th element $s_{in}(t)$ may be modeled as:

$$\sum_{m=1}^{M} a_{im} f(\beta_{im}(t - \tau_{nm})) \quad (2)$$

or in vector form as:

$$s_i = F_i(t) a_i \quad (3)$$

where $F_i(t) =$ $$[F_i(t)]_{nm} = f(\beta_{im}(t - \tau_{nm})) \quad (4)$$

where $\beta_{im} = \dfrac{C - v_{im}}{C + v_{im}} \quad (5)$ is the familiar expression for the Doppler effect of temporal dilation or contraction of the received waveform and C is the speed of sound propagation in the medium, and $\tau_{nm}$ is the time delay for the transmitted acoustic waveform to an m-th test cell location and back to the m-th sensor.

The following assumptions pertain to equation (3):
a) The scattering from a given test cell is frequency independent, at least in the band of transmitted waveform 11.
b) Each of the M disjoint test cells contains at most one scatterer.
c) The transmit waveform II is known and has finite energy:

$$\int_{-\infty}^{\infty} (f(t))^2 dt = E. \quad (7)$$

It can be assumed that, for each of the I hypotheses, both the test volume 10 and test cell geometry are specified a priori. Thus, the number of cells M and the position of each test cell are specified constants for all i=1,2, ... I. As the search for the actual target progresses, the test volume 10 will shift in some prescribed way through the insonified volume during each transmission cycle.

By adopting this Eulerian (fixed set of test cells) approach, the randomness of the signal $s_{in}(t)$ is characterized in the model of equation (2) solely by the statistical properties of the (zero-mean and complex) coefficients $\{a_{im}\}$ m=1 to M, i.e., by a M×M complex covariance matrix $K_{ai}$, i=1,2,...,I. $K_{si}$ is not restricted to be of full rank; therefore, the model of equation (2) allows for an arbitrary degree of coherence among the random waveforms scattered from each m-th test cell. In practice, the dimensions and decomposition of test volume 10 and estimates of $K_{ai}$ will be determined directly from both experimental data and calculations from scattering models of hypothesized targets. The resulting M×M covariance matrices for each of the I hypothesized targets may then be stored in a database.

In order to determine which of the I hypotheses is residing within the test volume 10, a Bayesian approach is used to generate a classification scheme. This approach is described in great detail by H. L. Van Trees in *Detection, Estimation, and Modulation Theory, Volume 1*, pages 24-34, John Wiley and Sons, Inc., New York, 1968, which is herein incorporated by reference. It is sufficient for the method of the present invention that the Bayesian approach is applied to yield estimates $â_i$ of the scattering coefficient vector $a_i$, i=1 to I. The estimated scattering coefficient vector $â_i$ is then used in the signal model set forth in equation (3) to yield estimates of the signal component vector $s_i$, i=1 to I. Finally, the estimated signal component vector $s_i$ is correlated with the output vector x(t) of receive array 17. A high correlation would be indicative of the target residing within test volume 10.

Specifically, the estimated scattering coefficient vector $\hat{a}_i$, $i=1$ to I is determined by:

$$K_{ai}\left[ ID + \left(\frac{2NE}{N_o}\phi K_{ai}\right)\right]^{-1} \left[\frac{2}{N_o}\int_{T_1}^{T_2} F_i(t)x(t)dt\right] \quad (7)$$

were, ID is an M×M identity matrix,
$N_o$ is a noise spectrum level due to background acoustic or electronic noise,
$\phi$ is an M×M waveform correlation matrix described by the equation $$\frac{1}{NE}\int_{T_1}^{T_2} F_i(t)F_i(t)dt \quad (8)$$

$F_i(t)$ is a N×M matrix having an n-th and m-th element such that $$[F_i(t)]_{nm} = f(\beta_{im}(r - \tau_{nm})) \quad (9)$$

and $F_i$
(t) is the complex conjugate-transpose of $F_i(t)$. Thus, the estimated scattering coefficient vector $\hat{a}_i$, $i=1$ to I is a function of the known covariance matrices, the size of receive array 17, and the transmitted acoustic waveform 11 appropriately time delayed and dilated (or contracted). As mentioned above, the estimated signal component vector $s_i$ is then generated by the signal model of equation (3). The correlation required by the Bayesian structure may be defined as the likelihood ratio $$\gamma_i \exp\left[\frac{2}{N_o}\int_{T_1}^{T_2} x(t)s_i(t)dt\right] \quad (10)$$

for $i=1$ to I. Since scattering coefficient vectors are unique and unrelated for each of the I hypotheses, a high correlation would be indicative of the estimated scattering coefficient vector for the target to be classified.

The advantages of the present invention are numerous. The method of the present invention implements a signal model that is a function of the scattering coefficient vector and the transmitted waveform. The signal model allows for scattering from objects with any amount of cross range extent and is not limited to a single scatterer at each down range location. The scattering coefficient vector is estimated via a Bayesian estimate/correlate structure. The resulting estimated signal component vector is then correlated with the actual output vector.

Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method of using active sonar in an underwater environment to classify an i-th target from a set of I possible targets, comprising the steps of:

a) transmitting an acoustic waveform $f(t_1)$ having finite energy E, over a period of time $t_1=0$ to T, into a test volume of water, said test volume being divided into M test cells, each of said test cells occupying a location m, m=1 to M, in said test volume, each of said test cells at said location m further having exactly one scattering coefficient $a_{im}$, $i=1$ to I, wherein the i-th target has a scattering coefficient vector $a_i$ such that $$a_{im} = [a_i]_m;$$

b) providing a database of M×M covariance matrices $K_{ai}$, $i=1$ to I, for each of said I possible targets;

c) receiving an acoustic waveform vector $x(t_2)$, over a period of time $t_2 = T_1$ to $T_2$ where $T_1 > T$, with an acoustic receive array having N acoustic sensors, said received acoustic waveform vector $x(t_2)$ having a corresponding signal component vector $s(t_2)$ and a corresponding noise component vector $n(t_2)$, wherein said signal component vector $s(t_2)$ at an n-th sensor of said N acoustic sensors for the i-th target is $s_{in}(t_2)$ and is represented by a signal model $$\sum_{m=1}^{M} a_{im}f(\beta_{im}(t_2 - \tau_{nm}))$$

$i=1$ to I and $n=1$ to N,
wherein $\tau_{nm}$ is a time delay for said transmitted acoustic waveform to travel to an m-th test cell location and back to the n-th sensor, $\beta_{im}$ is the Doppler effect of any relative motion temporal adjustment in the received waveform and $f(\beta_{im}(t_2 - \tau_{nm}))$ is said transmitted acoustic waveform compensated by said relative motion temporal adjustment;

d) estimating a scattering coefficient vector $\hat{a}_i$, $i=1$ to I, for each of said I possible targets according to the equation $$K_{ai}\left[ID + \left(\frac{2NE}{N_o}\phi K_{ai}\right)\right]^{-1}\left[\frac{2}{N_o}\int_{T_1}^{T_2} F_i(t_2) \times (t_2) dt_2\right]$$

wherein,
ID is an M×M identity matrix,
$N_o$ is a noise spectrum level due to background acoustic or electronic noise,
$\phi$ is an M×M waveform correlation matrix described by the equation $$\frac{1}{NE}\int_{T_1}^{T_2} F_i(t_2) F_i(t_2) dt_2$$

wherein $F_i(t_2)$ is a N×M matrix having an n-th and m-th element such that $$[F_i(t_2)]_{nm} = f(\beta_{im}(t_2 - \tau_{nm}))$$

and $F_i(t_2)$ is the complex conjugate-transpose of $F_i(T_2)$;

e) estimating a signal component vector $s_i(t_2)$, $i=1$ to I, for each of said I possible targets from said estimated scattering coefficient vector $\hat{a}_i$ using said signal model; and f) correlating said estimated signal component vector $s_i(t_2)$, $i=1$ to I, with said received acoustic waveform vector $x(_2)$ for each of said I possible targets wherein said correlation is indicative of the target to be classified.

2. A method of using active sonar in an underwater environment to classify a far field target using a set of known target hypotheses, comprising the steps of:

transmitting an acoustic waveform of known energy into a test volume of water, the test volume of water being divided into test cells wherein each test cell contains one scatterer that reflects the transmitted acoustic waveform according to a scattering coefficient wherein a unique and unrelated scattering coefficient for a test cell exists for each of the known target hypotheses and wherein a known covariance relationship exists between the test cells for each of the known target hypotheses;

receiving a portion of the reflection from each scatterer at an acoustic receive array wherein said received portion is a function of: 1) the scattering coefficients of the target to be classified and 2) the transmitted acoustic waveform appropriately time delayed by the time it takes the transmitted acoustic waveform to travel to the scatterer and reflect to the receive array including a further temporal adjustment due to the relative motion between the sonar and the test volume;

estimating the scattering coefficient at each test cell for the set of known target hypotheses based upon the known covariance relationships and said received portion of the reflection;

estimating the received portion of the reflection for the set of known target hypotheses based upon said estimated scattering coefficient and said appropriately time delayed transmitted acoustic waveform; and correlating said estimated received portion with said received portion for the set of known target hypotheses wherein a high correlation is indicative of the target to be classified.

3. A method according to claim 2 wherein said step of receiving begins after said a step of transmitting.

4. A method according to claim 3 wherein said step of estimating the scattering coefficient uses a Bayesian structure.

5. A method according to claim 3 wherein the scattering coefficient at each test cell is unique for each of the known target hypotheses.

* * * * *